United States Patent
Yamamoto

(10) Patent No.: US 11,973,245 B2
(45) Date of Patent: Apr. 30, 2024

(54) BATTERY MODULE

(71) Applicant: TOYOTA JIDOSHA KABUSHIKI KAISHA, Toyota (JP)

(72) Inventor: Kunimitsu Yamamoto, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 17/554,304

(22) Filed: Dec. 17, 2021

(65) Prior Publication Data

US 2022/0209372 A1 Jun. 30, 2022

(30) Foreign Application Priority Data

Dec. 25, 2020 (JP) .................. 2020-216569

(51) Int. Cl.
*H01M 50/526* (2021.01)
*H01M 50/522* (2021.01)
*H01M 50/524* (2021.01)

(52) U.S. Cl.
CPC ....... *H01M 50/526* (2021.01); *H01M 50/522* (2021.01); *H01M 50/524* (2021.01)

(58) Field of Classification Search
CPC .......... H01M 50/052; H01M 50/0525; H01M 50/0585; H01M 50/50–507; H01M 50/51; H01M 50/121; H01M 50/124; H01M 50/119; H01M 50/178; H01M 50/514; H01M 50/526; H01M 50/547; H01M 50/548; H01M 50/552; H01M 50/553; H01M 50/562; H01M 50/625; H01M 50/647; H01M 50/653; H01M 50/6551; H01M 4/131; H01M 10/0418; H01M 10/0431; H01M 10/0436; H01M 10/0459; H01M 10/0587; H01M 10/127; H01M 10/613; H01M 10/6553; H01M 10/6556;
(Continued)

(56) References Cited

U.S. PATENT DOCUMENTS

2016/0204394 A1 7/2016 Minamitani

FOREIGN PATENT DOCUMENTS

CN 206758546 U 12/2017
JP 2004031272 A * 1/2004 ............. Y02E 60/10
(Continued)

OTHER PUBLICATIONS

JP 2004031272 A—English Translation—Accessed Oct. 4, 2023 (Year: 2004).*
(Continued)

*Primary Examiner* — Mayla Gonzalez Ramos
*Assistant Examiner* — Bethany C Garcia
(74) *Attorney, Agent, or Firm* — Dickinson Wright, PLLC

(57) ABSTRACT

To provide a battery module with high volumetric efficiency. A battery module comprising stacked and connected unit cells each comprising a power generation element, a cathode terminal, and an anode terminal disposed on the opposite side of the cathode terminal of the power generation element, wherein a connection laminate layer including a resin layer, a metal layer and a resin layer in this sequence, is disposed between the unit cells, and wherein the metal layer of the connection laminate layer is electrically connected to the cathode terminal of one adjacent unit cell and the anode terminal of the other unit cell.

2 Claims, 3 Drawing Sheets

(58) Field of Classification Search
CPC ......... H01M 10/6562; H01M 10/6567; H01M 10/658; H01M 2004/021; H01M 2004/029; H01M 6/10; H01M 6/48; H01M 6/485; H01M 50/129; H01M 50/521–526; H01M 50/227; Y02E 60/10; Y02E 10/50; Y02E 60/13; Y02P 70/50; H02G 5/005; H01B 7/0225; H01G 2/10; H01L 31/042; H01L 31/0512; H01L 31/18; Y10T 29/4911; Y02T 10/70
See application file for complete search history.

(56) References Cited

FOREIGN PATENT DOCUMENTS

| | | | | |
|---|---|---|---|---|
| JP | 2004095217 | A | | 3/2004 |
| JP | 2005190885 | A | | 7/2005 |
| JP | 2008041619 | A * | 2/2008 | ............. Y02E 60/10 |
| JP | 2011071132 | A | | 4/2011 |
| JP | 2019169427 | A | | 10/2019 |

OTHER PUBLICATIONS

JP-2008041619-A—English Translation—Accessed Oct. 4, 2023 (Year: 2008).*

* cited by examiner

BATTERY MODULE

TECHNICAL FIELD

The disclosure relates to a battery module.

BACKGROUND

Recently, with the rapid spread of information-related devices and communication devices such as personal computers, video cameras and mobile phones, the development of batteries for use as the power source of the devices, is increasingly important. Also, in the automotive industry, etc., the development of high-power and high-capacity batteries for battery electric vehicles or hybrid electric vehicles has been promoted.

Development of a battery module composed of, among various kinds of batteries, a stack of thin-and-light batteries is underway, in each of which a laminated film is used in its outer casing.

Patent Literature 1 discloses a battery module including laminated batteries and bus bars for connecting the electrodes of the batteries.

Patent Literature 2 discloses a laminated material for battery case, in which at least a resin film, a metal film, and a resin film are laminated in this order, and the metal film is longer than the resin films at its end.

Patent Literature 3 discloses a laminated battery module in which the bending part of the negative electrode terminal of a laminated battery is connected to the bending part of the positive electrode terminal of an adjacent laminated battery.

Patent Literature 1: Japanese Patent Application Laid-Open (JP-A) No. 2019-169427

Patent Literature 2: JP-A No. 2004-095217

Patent Literature 3: JP-A No. 2005-190885

Enhanced volumetric efficiency is required of a battery module composed of laminated batteries connected to each other.

SUMMARY

The disclosed embodiments were achieved in light of the above circumstances. An object of the disclosed embodiments is to provide a battery module with high volumetric efficiency.

In a first embodiment, there is provided a battery module comprising stacked and connected unit cells each comprising a power generation element, a cathode terminal, and an anode terminal disposed on the opposite side of the cathode terminal of the power generation element,
  wherein a connection laminate layer including a resin layer, a metal layer and a resin layer in this sequence, is disposed between the unit cells, and
  wherein the metal layer of the connection laminate layer is electrically connected to the cathode terminal of one adjacent unit cell and the anode terminal of the other unit cell.

The metal layer of the connection laminate layer may be present on a whole surface of a part facing the power generation elements of the unit cells adjacent to each other.

The connection laminate layer may include, in both end regions in planar direction of the connection laminate layer, a metal-resin unattached part in which the metal layer and the resin layer are unattached to each other, and a metal exposed part in which the metal layer is projected to planar direction outside from the metal-resin unattached part, and the connection laminate layer may include, in a central region in planar direction of the connection laminate layer, a metal-resin attached part in which the metal layer and the resin layer are attached to each other.

According to the disclosed embodiments, a battery module with high volumetric efficiency is provided.

BRIEF DESCRIPTION OF THE DRAWINGS

In the accompanying drawings.

DETAILED DESCRIPTION

The battery module of the disclosed embodiments is a battery module comprising stacked and connected unit cells each comprising a power generation element, a cathode terminal, and an anode terminal disposed on the opposite side of the cathode terminal of the power generation element,
  wherein a connection laminate layer including a resin layer, a metal layer and a resin layer in this sequence, is disposed between the unit cells, and
  wherein the metal layer of the connection laminate layer is electrically connected to the cathode terminal of one adjacent unit cell and the anode terminal of the other unit cell.

In the disclosed embodiments, for the sake of simplicity, a minimum unit battery will be referred to as "unit cell". It may be referred to as "battery cell" or "cell" instead of "unit cell".

Also in the disclosed embodiments, a group of unit cells disposed in series (or it may be a combination of unit cells disposed in series and unit cells disposed in parallel) will be referred to as "battery module". Instead of "battery module", it may be referred to as "battery pack" or "assembled battery", or it may be simply referred to as "battery" (a group of unit cells).

Figure 1:
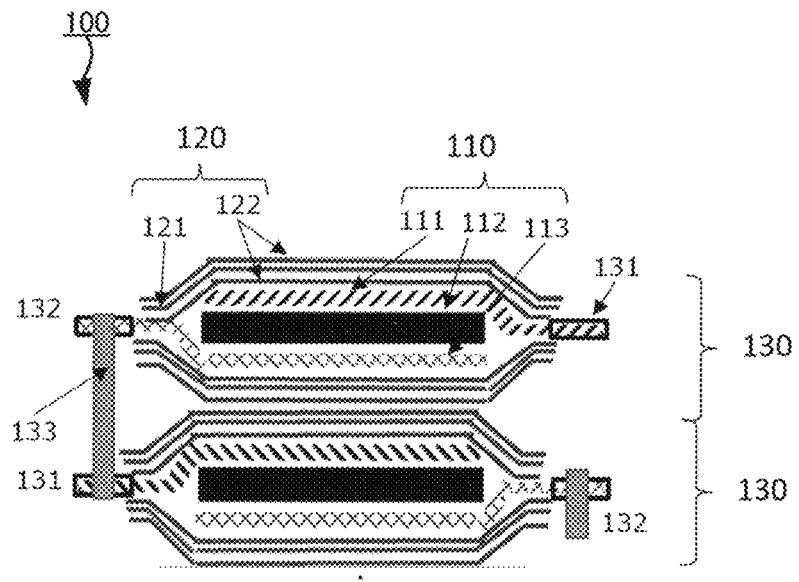
FIG. 1 is a schematic sectional view of an example of a conventional battery module.

FIG. 1 is a schematic sectional view of an example of a conventional battery module.

A battery module 100 shown in FIG. 1 is formed by stacking unit cells 130 in each of which a power generation element 110 is sandwiched by a pair of connection laminate layers 120. The cathode terminal 131 and anode terminal 132 of each of the unit cells 130 adjacent to each other, are connected by a bus-bar 133.

The power generation element 110 includes a cathode 111, a separator 112 and an anode 113.

Each connection laminate layer 120 includes a resin layer 122, a metal layer 121 and a resin layer 122 in this sequence. In FIG. 1, " . . . " means a repetition of the unit cells 130.

In the prior art, the laminate-type unit cells in each of which the power generation element is sandwiched by the pair of connection laminate layers, are stacked to form the battery module. However, in the structure of connection between the laminate-type unit cells of the prior-art battery module, two connection laminate layers are present between the laminate-type unit cells, and the cathode and anode of the cells adjacent to each other are connected by a bus-bar or the like. Accordingly, there is a problem in that the volumetric efficiency of the whole battery module is poor.

Figure 2:
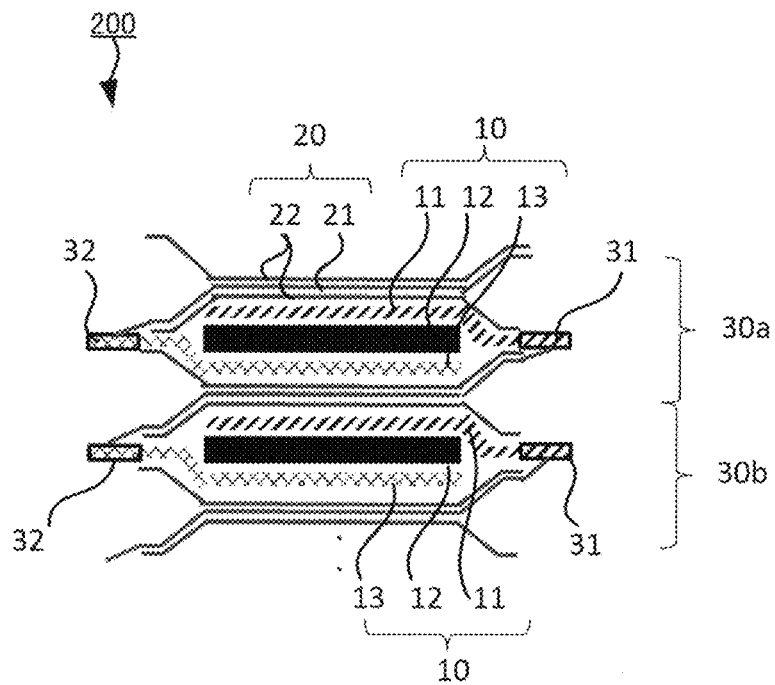
FIG. 2 is a schematic sectional view of an example of the battery module of the disclosed embodiments.

FIG. 2 is a schematic sectional view of an example of the battery module of the disclosed embodiments. In FIG. 2, " . . . " indicates a repetition of unit cells 30 (30a and 30b).

A battery module 200 shown in FIG. 2 is formed by stacking the unit cells 30, each of which includes a power generation element 10 and between which a connection laminate layer 20 is disposed. The metal layer 21 of the connection laminate layer 20 is electrically connected to the cathode terminal 31 of one adjacent unit cell 30 (30a) and the anode terminal 32 of the other unit cell 30 (30b).

The power generation element 10 includes a cathode 11, a separator 12 and an anode 13.

The connection laminate layer 20 includes a resin layer 22, the metal layer 21 and a resin layer 22 in this sequence.

Figure 3:
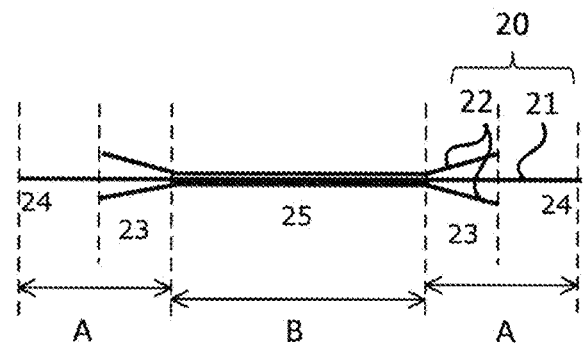
FIG. 3 is a schematic sectional view of an example of the connection laminate layer included in the battery module of the disclosed embodiments.

FIG. 3 is a schematic sectional view of an example of the connection laminate layer included in the battery module of the disclosed embodiments.

The connection laminate layer 20 shown in FIG. 3 includes a resin layer 22, a metal layer 21 and a resin layer 22 in this sequence. The connection laminate layer 20 includes, in both end regions A in planar direction of the connection laminate layer 20, a metal-resin unattached part 23 in which the metal layer 21 and the resin layer 22 are unattached to each other, and a metal exposed part 24 in which the metal layer 21 is projected to planar direction outside from the metal-resin unattached part 23, and the connection laminate layer 20 includes, in a central region B in planar direction of the connection laminate layer 20, a metal-resin attached part 25 in which the metal layer 21 and the resin layer 22 are attached to each other.

Accordingly, in the battery module 200 shown in FIG. 2, more specifically, the metal exposed part 24 of the metal layer of the connection laminate layer 20 shown in FIG. 3 is electrically connected to the cathode terminal 31 of one adjacent unit cell 30 and the anode terminal 32 of the other unit cell 30.

In the disclosed embodiments, one connection laminate layer is present between the unit cells, and the metal layer in the connection laminate layer is used as an electrical connection member between the unit cells. In the battery module, accordingly, the volume of a casing including the connection laminate layer can be reduced to half, and the bus-bar (a cell connecting member) is no longer necessary.

Figure 4:
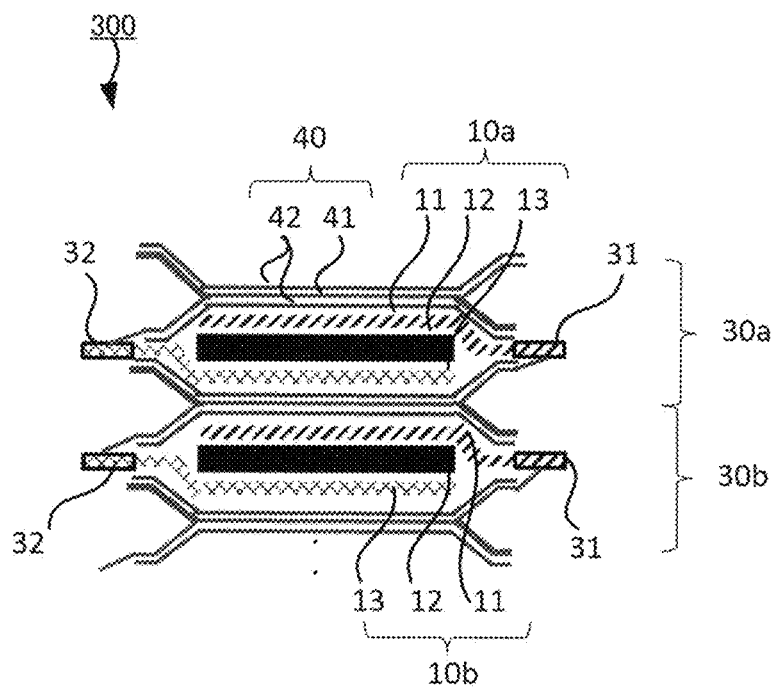
FIG. 4 is a schematic sectional view of another example of the battery module of the disclosed embodiments.

FIG. 4 is a schematic sectional view of another example of the battery module of the disclosed embodiments. Of the components shown in FIG. 4, the same components as FIG. 2 are provided with the same numbers as FIG. 2 and will not be described here for simplicity.

Figure 5:
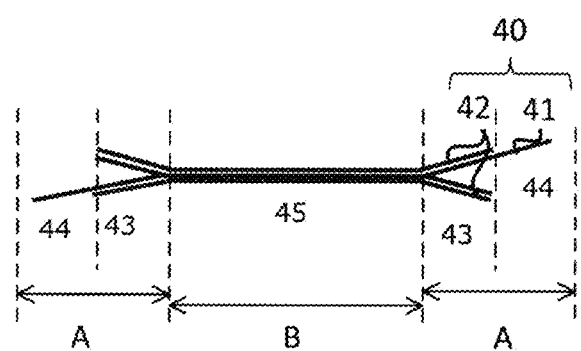
FIG. 5 is a schematic sectional view of another example of the connection laminate layer included in the battery module of the disclosed embodiments.

FIG. 5 is a schematic sectional view of another example of the connection laminate layer included in the battery module of the disclosed embodiments.

The connection laminate layer 40 shown in FIG. 5 includes a resin layer 42, a metal layer 41 and a resin layer 42 in this sequence. The connection laminate layer 40 includes, in both end regions A in planar direction of the connection laminate layer 40, a metal-resin unattached part 43 in which the metal layer 41 and the resin layer 42 are unattached to each other, and a metal exposed part 44 in which the metal layer 41 is projected to planar direction outside from the metal-resin unattached part 43, and the connection laminate layer 40 includes, in a central region B in planar direction of the connection laminate layer 40, a metal-resin attached part 45 in which the metal layer 41 and the resin layer 42 are attached to each other. The metal layer 41 branches into two metal layers at the metal-resin unattached part 43. Of the two metal layers 41 branched at the metal-resin unattached part 43, one metal layer includes the metal exposed part 44. In the disclosed embodiments, at least one of the two metal layers 41 branched at the metal-resin unattached part 43, may include the metal exposed part 44.

A battery module 300 shown in FIG. 4 includes the connection laminate layer 40 shown in FIG. 5. Since the metal layer 41 of the connection laminate layer 40 shown in FIG. 5 branches into the two metal layers at the metal-resin unattached part 43, in the battery module 300 shown in FIG. 4, the metal layer 41 is present on the whole surface of the part facing the power generation elements 10 (10a, 10b) of the unit cells 30 adjacent to each other.

Since the battery module 300 shown in FIG. 4 has such a structure, that all of the part facing to the electrode body (power generation element) is covered with the metal layer, water permeation into the casing (the inside of the battery) is suppressed. Accordingly, water permeation into the casing from the part in which the metal layer does not face the power generation element, and the resulting deterioration of the power generation element in the casing, are suppressed. Also in the battery module 300, since water permeation into the casing (the inside of the battery) is suppressed, excellent durability is obtained even in a high humidity environment.

Unit Cell

The battery module of the disclosed embodiments comprises the stacked and connected unit cells.

The number of the stacked unit cells is not particularly limited, as long as it is two or more. The upper limit of the number of the stacked unit cells may be 200 or less, for example.

Each of the unit cells comprises a power generation element, a cathode terminal, and an anode terminal disposed on the opposite side (in planar direction) of the cathode terminal of the power generation element.

In general, the power generation element includes a cathode, an electrolyte layer and an anode.

The cathode is connected to the cathode terminal, and the anode is connected to the anode terminal.

Connection Laminate Layer

The connection laminate layer is disposed between the unit cells.

From the viewpoint of hermetically closing the battery module, the connection laminate layer may be disposed at the stacking direction outside of the unit cells disposed at both ends in stacking direction of the unit cells.

The connection laminate layer includes a resin layer, a metal layer and a resin layer in this sequence.

The resin layer contains a resin. the resin may be polyethylene, polypropylene, acrylic resin or the like.

The metal layer contains a metal. The metal is not particularly limited, as long as it is electroconductive. For example, the resin may be aluminum (Al).

The metal layer of the connection laminate layer may be electrically connected to the cathode terminal of one adjacent unit cell and the anode terminal of the other unit cell. The metal layer of the connection laminate layer disposed at the stacking direction outside of the unit cells disposed at both ends in stacking direction of the unit cells, may be electrically connected to the cathode or anode terminal of the unit cells disposed at both ends.

Cathode

The cathode includes the cathode layer and the cathode current collector. The cathode terminal may be connected to the cathode.

Cathode Layer

The cathode layer contains a cathode active material. As optional components, the cathode layer may contain a solid electrolyte, a conductive material, a binder, etc.

There is no particular limitation on the type of the cathode active material, and any material which can be used as an active material of a battery can be employed. When the battery is a lithium secondary battery, as the cathode active material, examples include, but are not limited to, lithium metal (Li), a lithium alloy, $LiCoO_2$, $LiNi_{0.8}Co_{0.15}Al_{0.05}O_2$, $LiNi_xCo_{1-x}O_2$ (0<x<1), $LiNi_{1/3}Co_{1/3}Mn_{1/3}O_2$, $LiMnO_2$, a different element-substituted Li—Mn spinel, lithium titanate, lithium metal phosphate, LiCoN, $Li_2SiO_3$, and $Li_4SiO_4$, a transition metal oxide, $TiS_2$, Si, $SiO_2$, a Si alloy and a lithium storage intermetallic compound. As the different element-substituted Li—Mn spinel, examples include, but are not limited to, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. As the lithium titanate, examples include, but are not limited to, $Li_4Ti_5O_{12}$. As the lithium metal phosphate, examples include, but are not limited to, $LiFePO_4$, $LiMnPO_4$, $LiCoPO_4$ and $LiNiPO_4$. As the transition metal oxide, examples include, but are not limited to, $V_2O_5$ and $MoO_3$. As the lithium storage intermetallic compound, examples include, but are not limited to, $Mg_2Sn$, $Mg_2Ge$, $Mg_2Sb$ and $Cu_3Sb$.

As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. As the Si alloy, examples include, but are not limited to, an alloy of Si and a metal such as Li, and an alloy of Si and at least one kind of metal selected from the group consisting of Sn, Ge and Al.

The form of the cathode active material is not particularly limited. It may be a particulate form. When the cathode active material is in a particulate form, the cathode active material may be primary particles or secondary particles. The average particle diameter (D50) of the cathode active material may be 1 nm or more and 100 µm or less, or it may be 10 nm or more and 30 µm or less, for example.

On the surface of the cathode active material, a coating layer containing a Li ion conductive oxide may be formed. This is because a reaction between the cathode active material and the solid electrolyte can be suppressed.

As the Li ion conductive oxide, examples include, but are not limited to, $LiNbO_3$, $Li_4Ti_5O_{12}$, and $Li_3PO_4$. The thickness of the coating layer is, for example, 0.1 nm or more, and it may be 1 nm or more. On the other hand, the thickness of the coating layer is, for example, 100 nm or less, and it may be 20 nm or less. The coating rate of the coating layer on the surface of the cathode active material is, for example, 70% or more, and it may be 90% or more.

As the solid electrolyte, examples include, but are not limited to, those exemplified below in [Electrolyte layer].

The amount of the solid electrolyte contained in the cathode layer is not particularly limited. It may be within a range of, for example, from 1 mass % to 80 mass % of the total mass (100 mass %) of the cathode layer.

As the conductive material, a known material can be used, such as a carbon material and metal particles. As the carbon material, examples include, but are not limited to, at least one selected from the group consisting of acetylene black, furnace black, VGCF, carbon nanotube and carbon nanofiber. Among them, at least one selected from the group consisting of VGCF, carbon nanotube and carbon nanofiber may be used, from the viewpoint of electron conductivity. As the metal particles, examples include, but are not limited to, particles of Ni, Cu, Fe and SUS.

The amount of the conductive material contained in the cathode layer is not particularly limited.

As the binder, examples include, but are not limited to, acrylonitrile butadiene rubber (ABR), butadiene rubber (BR), polyvinylidene fluoride (PVdF) and styrene butadiene rubber (SBR). The amount of the binder contained in the cathode layer is not particularly limited.

The thickness of the cathode layer is not particularly limited.

The cathode layer can be formed by a conventionally known method.

For example, the cathode active material and, as needed, other components are put in a solvent; they are stirred to prepare a slurry for a cathode layer; and the slurry for the cathode layer is applied on one surface of a support such as a cathode current collector; and the applied slurry is dried, thereby obtaining the cathode layer.

As the solvent, examples include, but are not limited to, butyl acetate, butyl butyrate, heptane, and N-methyl-2-pyrrolidone (NMP).

The method for applying the slurry for the cathode layer on one surface of the support such as the cathode current collector, is not particularly limited. As the method, examples include, but are not limited to, the doctor blades method, the metal mask printing method, the static coating method, the dip coating method, the spread coating method, the roll coating method, the gravure coating method, and the screen printing method.

As the support, one having self-supporting property can be appropriately selected and used without particular limitation. For example, a metal foil such as Cu and Al can be used.

As another method for forming the cathode layer, the cathode layer may be formed by pressure molding a cathode mixture powder containing the cathode active material and, as needed, other components. In the case of pressure molding the cathode mixture powder, generally, a press pressure of about 1 MPa or more and 600 MPa or less is applied.

The method for applying the pressure is not particularly limited. As the method, examples include, but are not limited to, a pressure applying method using a plate press machine, a roll press machine, or the like.

Cathode Current Collector

As the cathode current collector, a known metal that can be used as the current collector of a battery, can be used. As the metal, examples include, but are not limited to, a metal material containing one or more elements selected from the group consisting of Cu, Ni, Al, V, Au, Pt, Mg, Fe, Ti, Co, Cr, Zn, Ge and In. As the cathode current collector, examples include, but are not limited to, SUS, aluminum, nickel, iron, titanium and carbon.

The form of the cathode current collector is not particularly limited. As the form, examples include, but are not limited to, various kinds of forms such as a foil form and a mesh form. The thickness of the cathode current collector varies depending on the shape. For example, it may be in a range of from 1 μm to 50 μm, or it may be in a range of from 5 μm to 20 μm.

The cathode current collector may be connected to the cathode terminal. The cathode current collector may be the cathode terminal.

Anode

The anode includes the anode current collector and the anode layer. The anode terminal may be connected to the anode.

Anode Layer

The anode layer contains at least an anode active material. As needed, it contains an electroconductive material, a binder, a solid electrolyte, etc.

As the anode active material, examples include, but are not limited to, graphite, mesocarbon microbeads (MCMB), highly oriented pyrolytic graphite (HOPG), hard carbon, soft carbon, elemental lithium, a lithium alloy, elemental Si, a Si alloy and $Li_4Ti_5O_{12}$. As the lithium alloy and the Si alloy, those exemplified above as the cathode active material may be used.

The form of the anode active material is not particularly limited. As the form, examples include, but are not limited to, a particulate form and a plate form. When the anode active material is in a particulate form, the anode active material may be primary particles or secondary particles. The average particle diameter (D50) of the anode active material may be 1 nm or more and 100 μm or less, or it may be 10 nm or more and 30 μm or less, for example.

As the electroconductive material and binder used in the anode layer, those exemplified above as the electroconductive material and binder used in the cathode layer, may be used. As the solid electrolyte used in the anode layer, those exemplified below as the solid electrolyte used in the electrolyte layer, may be used.

The thickness of the anode layer is not particularly limited. For example, it may be from 10 μm to 100 μm.

The amount of the anode active material contained in the anode layer is not particularly limited. It may be from 20 mass % to 90 mass %, for example.

Anode Current Collector

The material for the anode current collector may be a material that is not alloyed with Li, such as SUS, copper and nickel. As the form of the anode current collector, examples include, but are not limited to, a foil form and a plate form. The plan-view shape of the anode current collector is not particularly limited, and examples thereof include, but are not limited to, a circular shape, an ellipse shape, a rectangular shape and any arbitrary polygonal shape. The thickness of the anode current collector varies depending on the shape. For example, it may be in a range of from 1 μm to 50 μm, or it may be in a range of from 5 μm to 20 μm.

The anode current collector may be connected to the anode terminal. The anode current collector may be the anode terminal.

Electrolyte Layer

The electrolyte layer contains at least an electrolyte.

As the electrolyte, examples include, but are not limited to, a non-aqueous electrolyte, a gel electrolyte and a solid electrolyte. These electrolytes may be used alone or in combination of two or more kinds.

As the non-aqueous liquid electrolyte, one containing a lithium salt and a non-aqueous solvent is generally used.

As the lithium salt, examples include, but are not limited to, inorganic lithium salts such as $LiPF_6$, $LiBF_4$, $LiClO_4$ and $LiAsF_6$, and organic lithium salts such as $LiCF_3SO_3$, $LiN(SO_2CF_3)_2$ (Li-TFSI), $LiN(SO_2C_2F_5)_2$ and $LiC(SO_2CF_3)_3$.

As the non-aqueous solvent, examples include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof. From the viewpoint of obtaining high dielectric constant and low viscosity, the non-aqueous solvent may be a mixture of a cyclic carbonate compound having high dielectric constant and high viscosity (such as EC, PC and BC) and a chain carbonate compound having low dielectric constant and low viscosity (such as DMC, DEC and EMC), or it may be a mixture of EC and DEC.

The concentration of the lithium salt in the non-aqueous liquid electrolyte may be from 0.3 M to 5 M, for example.

The gel electrolyte is generally a non-aqueous liquid electrolyte gelled by addition of a polymer.

More specifically, the gel electrolyte is obtained by gelling the non-aqueous liquid electrolyte by addition of a polymer such as polyethylene oxide, polypropylene oxide, polyacrylonitrile, polyvinylidene fluoride (PVdF), polyurethane, polyacrylate and cellulose.

As the electrolyte layer, a separator which is impregnated with an electrolyte such as the above-mentioned aqueous electrolyte and which prevents contact between the cathode layer and the anode layer, may be used.

The material for the separator is not particularly limited, as long as it is a porous film. As the material, examples include, but are not limited to, resins such as polyethylene (PE), polypropylene (PP), polyester, cellulose and polyamide. Of them, the material for the separator may be polyethylene or polypropylene. The separator may have a single-layered structure or a multi-layered structure. As the separator having a multi-layered structure, examples include, but are not limited to, a separator having a two-layered structure such as PE/PP, and a separator having a three-layered structure such as PP/PE/PP and PE/PP/PE.

The separator may be a non-woven fabric such as a resin non-woven fabric or a glass fiber non-woven fabric.

The electrolyte layer may be a solid electrolyte layer.

The solid electrolyte layer contains at least a solid electrolyte.

As the solid electrolyte contained in the solid electrolyte layer, a conventionally-known solid electrolyte that is applicable to solid-state batteries can be appropriately used, such as an oxide-based solid electrolyte and a sulfide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. Note that the description "Li$_2$S—P$_2$S" means a material consisting of a raw material composition including Li$_2$S and P$_2$S$_5$, and the same applies to other descriptions. Also, "X" of the above-described LiX indicates a halogen element. The raw material composition may contain one or two or more kinds of LiX. When two or more kinds of LiX are contained, the mixing ratio of the two or more kinds of LiX is not particularly limited.

The molar ratio of the elements in the sulfide-based solid electrolyte can be controlled by adjusting the amounts of the elements in the raw material. Also, the molar ratio and composition of the elements in the sulfide-based solid electrolyte can be measured by ICP emission spectrometry, for example.

The sulfide-based solid electrolyte may be a sulfide glass, a crystalline sulfide glass (glass ceramic) or a crystalline material obtained by carrying out a solid-phase reaction treatment on the raw material composition.

The crystal state of the sulfide-based solid electrolyte can be confirmed, for example, by carrying out powder X-ray diffraction measurement using CuKα rays on the sulfide-based solid electrolyte.

The sulfide glass can be obtained by carrying out an amorphous treatment on the raw material composition such as a mixture of Li$_2$S and P$_2$S$_5$. As the amorphous treatment, examples include, but are not limited to, mechanical milling.

The glass ceramic can be obtained, for example, by heat-treating a sulfide glass.

The heat treatment temperature may be a temperature higher than the crystallization temperature (Tc) observed by thermal analysis measurement of the sulfide glass, and it is generally 195° C. or more. On the other hand, the upper limit of the heat treatment temperature is not particularly limited.

The crystallization temperature (Tc) of the sulfide glass can be measured by differential thermal analysis (DTA).

The heat treatment time is not particularly limited, as long as the desired crystallinity of the glass ceramic is obtained. For example, it is within a range of from one minute to 24 hours, and it may be within a range of from one minute to 10 hours.

The heat treatment method is not particularly limited. As the heat treatment method, examples include, but are not limited to, a heat treatment method using a firing furnace.

As the oxide-based solid electrolyte, examples include, but are not limited to, a substance having a garnet-type crystal structure including, for example, a Li element, a La element, an A element (A is at least one of Zr, Nb, Ta and Al) and an O element. The oxide-based solid electrolyte may be Li$_{3+x}$PO$_{4-x}$N$_x$ (1≤x≤3), for example.

The form of the solid electrolyte may be a particulate form, from the viewpoint of good handleability.

The average particle diameter (D50) of the solid electrolyte particles is not particularly limited. The lower limit of the average particle diameter may be 0.5 μm or more, and the upper limit may be 2 μm or less.

In the disclosed embodiments, the average particle diameter of the particles is the value of a volume-based median diameter (D50) measured by laser diffraction and scattering particle size distribution measurement, unless otherwise noted. In the disclosed embodiments, the median diameter (D50) is a diameter (volume average diameter) such that the cumulative volume of the particles is half (50%) of the total volume when the particles are arranged in order of particle diameter from smallest to largest.

The solid electrolyte may be one kind of solid electrolyte, or it may be 2 or more kinds of solid electrolytes. In the case of using 2 or more kinds of solid electrolytes, they may be mixed together, or they may be formed into layers to obtain a multilayer structure.

The amount of the solid electrolyte in the solid electrolyte layer is not particularly limited. For example, it may be 50 mass % or more; it may be within a range of 60 mass % or more and 100 mass % or less; it may be within a range of 70 mass % or more and 100 mass % or less; or it may be 100 mass %.

A binder may also be contained in the solid electrolyte layer, from the viewpoint of expressing plasticity, etc. As the binder, examples include, but are not limited to, materials exemplified above as the binder used in the cathode layer. However, to facilitate high output, the binder contained in the solid electrolyte layer may be 5 mass % or less, from the viewpoint of preventing excessive aggregation of the solid electrolyte and enabling the formation of the solid electrolyte layer in which the solid electrolyte is uniformly dispersed.

As the method for forming the solid electrolyte layer, examples include, but are not limited to, pressure molding a solid electrolyte material powder containing a solid electrolyte. In the case of pressure molding the solid electrolyte material powder, generally, a press pressure of about 1 MPa or more and 600 MPa or less is applied.

The method for applying the pressure is not particularly limited. As the method, examples include, but are not limited to, the pressure applying method exemplified above in the formation of the cathode layer.

The thickness of the electrolyte layer is not particularly limited. In general, it is 0.1 μm or more and 1 mm or less.

The unit cells may be primary or secondary batteries. The unit cells may be secondary batteries, because secondary batteries are rechargeable and useful as a car battery, for example. Also, the unit cells may be solid-state batteries. The solid-state batteries may be solid-state lithium secondary batteries.

The battery module of the disclosed embodiments may be produced by the following method, for example. First, the unit cells are prepared, in each of which the cathode current collector (cathode terminal), the cathode layer, the solid electrolyte layer, the anode layer and the anode current collector (anode terminal) are disposed in this sequence. Then, the connection laminate layers are disposed between the unit cells, and the ends of the connection laminate layers are thermally welded, thereby obtaining the battery module of the disclosed embodiments.

EXAMPLES

Example 1

Production of Cathode

LiNi$_{1/3}$Co$_{1/3}$Mn$_{1/3}$O$_2$ (a cathode active material), a sulfide-based solid electrolyte and PVdF (a binder) were weighed in a mass ratio of 80:15:5, and they were mixed with a dispersion medium to obtain a mixture.

The mixture was dispersed by an ultrasonic homogenizer, thereby obtaining a cathode slurry. The cathode slurry was applied onto a cathode current collector (an aluminum foil, thickness 15 μm) by blade coating with an applicator. The applied cathode slurry was dried, thereby obtaining a cathode in which a cathode layer was formed on the cathode current collector.

Production of Anode

Si (an anode active material), a sulfide-based solid electrolyte and SBR (a binder) were prepared.

They weighed in a mass ratio of 50:48:2, and they were mixed with a dispersion medium to obtain a mixture. The mixture was dispersed by an ultrasonic homogenizer, thereby obtaining an anode slurry.

The anode slurry was applied onto an anode current collector (a Cu foil, thickness 15 μm) by blade coating with an applicator. The applied anode slurry was dried, thereby obtaining an anode in which an anode layer was formed on the anode current collector.

Production of Solid Electrolyte Layer

A pressed sulfide-based solid electrolyte powder was used as a solid electrolyte layer.

Production of Unit Cells

Two unit cells were prepared, in each of which the cathode current collector (cathode terminal), the cathode layer, the solid electrolyte layer, the anode layer and the anode current collector (anode terminal) were disposed in this sequence.

Production of Battery Module

Three connection laminate layers were prepared. The three connection laminate layers and the two unit cells were disposed so that the connection laminate layer, the unit cell, the connection laminate layer, the unit cell and the connection laminate layer were disposed in this sequence. The ends of the connection laminate layers were thermally welded, thereby obtaining a battery module. The metal-resin unattached part of the metal layer of the connection laminate layer used had a structure that faced only the power generation element of one of the unit cells adjacent to each other. The two unit cells were connected in series.

Example 2

The battery module of Example 2 was produced in the same manner as Example 1, except that in [Production of battery module], the metal-resin unattached part of the metal layer of the connection laminate layer used had a structure that faced the power generation element of both of the unit cells adjacent to each other.

Comparative Example 1

The battery module of Comparative Example 1 was produced in the same manner as Example 1, except that in [Production of battery module], two unit cells and four connection laminate layers were prepared, and they were disposed so that the connection laminate layer, the unit cell, the connection laminate layer, the connection laminate layer, the unit cell and the connection laminate layer were disposed in this sequence. More specifically, the battery module was produced in the same manner as Example 1, except that in [Production of unit cells], a unit cell was sandwiched by a pair of connection laminate layers to produce a laminate-type unit cell, and a total of two laminate-type unit cell were produced, and in [Production of battery module], the two laminate-type unit cells were stacked, and their terminals were connected by a bus-bar for series connection.

Evaluation Method

The following durability test was carried out on the battery modules of Example 1, Example 2 and Comparative Example 1, and the capacity retention rate of the battery modules were measured.

Discharge Capacity Measurement Before Durability Test

Each of the battery modules obtained in Examples 1 and 2 and Comparative Example 1 was fixed at a fixing pressure of 1 MPa. Then, the battery module was charged at 25° C. and 0.1 C from a SOC of 0% to 100% and discharged at 0.1 C from a SOC of 100% to 0%, and the discharge capacity of each battery module before the durability test was measured.

Durability Test

Charging at 1 C from a SOC of 0% to 100% in the condition of a temperature of 60° C. and a relative humidity (RH) of 90% and discharging at 1 C from a SOC of 100% to 0% in the same condition, were defined as one cycle. This charge and discharge cycle was repeated a total of 100 times (100 cycles) on each of the battery modules obtained in Examples 1 and 2 and Comparative Example 1. The results are shown in Table 1.

Discharge Capacity Measurement after Durability Test

After the durability test, each of the battery modules obtained in Examples 1 and 2 and Comparative Example 1 was charged at 25° C. and 0.1 C from a SOC of 0% to 100% and discharged at 0.1 C from a SOC of 100% to 0%, and the discharge capacity of each battery module after the durability test was measured.

For each battery module, the discharge capacity after the durability test was divided by the discharge capacity before the durability test. The value thus obtained was multiplied by 100, thereby obtaining the capacity retention rate of the battery module. Table 1 shows the result of the capacity retention rate of Example 2 when the capacity retention rate of Comparative Example 1 was determined as 100%. Table 2 shows the results of the capacity retention rates of Examples 1 and 2.

TABLE 1

|  | Structure (Ref ratio) | Capacity retention rate |
|---|---|---|
| Comparative Example 1 | FIG. 1 | 100% (Ref) |
| Example 2 | FIG. 4 | 202% |

TABLE 2

|  | Structure | Capacity retention rate |
|---|---|---|
| Example 1 | FIG. 2 | 46% |
| Example 2 | FIG. 4 | 93% |

Evaluation Result

It was confirmed that the battery modules of Examples 1 and 2 are chargeable and dischargeable as battery.

The capacity retention rate of the battery module of Example 2 is two times or more higher than the battery modules of Comparative Example 1 and Example 1.

REFERENCE SIGNS LIST

10. Power generation element (10a, 10b)
11. Cathode
12. Separator (electrolyte layer)
13. Anode
20. Connection laminate layer
21. Metal layer
22. Resin layer
23. Metal-resin unattached part
24. Metal exposed part
25. Metal-resin attached part
30. Unit cell (30a) (30b)
31. Cathode terminal
32. Anode terminal
40. Connection laminate layer
41. Metal layer
42. Resin layer
43. Metal-resin unattached part
44. Metal exposed part
45. Metal-resin attached part
100. Battery module
110. Power generation element
111. Cathode
112. Separator
113. Anode
120. Connection laminate layer
121. Metal layer
122. Resin layer
130. Unit cell
131. Cathode terminal
132. Anode terminal
133. Bus-bar
200. Battery module
300. Battery module
A. Both end regions
B. Central region

The invention claimed is:

1. A battery module comprising stacked and connected unit cells each comprising a power generation element, a cathode terminal, and an anode terminal disposed on the opposite side of the cathode terminal of the power generation element,
wherein a connection laminate layer having two end regions is disposed between the unit cells, the connection laminate layer including a resin layer, a metal layer and a resin layer in this sequence,
wherein the metal layer of the connection laminate layer is electrically connected to the cathode terminal of one adjacent unit cell and the anode terminal of the other unit cell,
wherein the connection laminate layer includes, in both end regions in a planar direction of the connection laminate layer, a metal-resin unattached part in which the metal layer and the resin layer are unattached to each other, and a metal exposed part in which the metal layer is projected in the planar direction outside from the metal-resin unattached part, and
wherein the connection laminate layer includes, in a central region in the planar direction of the connection laminate layer, a metal-resin attached part in which the metal layer and the resin layer are attached to each other.

2. The battery module according to claim 1, wherein the metal layer of the connection laminate layer is present on a whole surface of a part facing the power generation elements of the unit cells adjacent to each other.

* * * * *